United States Patent
Keller et al.

(10) Patent No.: US 12,022,023 B2
(45) Date of Patent: Jun. 25, 2024

(54) METHOD AND NETWORK NODE FOR HOME CHARGING OF OFFLOADED TRAFFIC AT VISITED NETWORK

(71) Applicant: Telefonaktiebolaget LM Ericsson (publ), Stockholm (SE)

(72) Inventors: Ralf Keller, Würselen (DE); Maria Belen Pancorbo Marcos, Madrid (ES); Robert Törnkvist, Karlskrona (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/912,636

(22) PCT Filed: Mar. 17, 2021

(86) PCT No.: PCT/SE2021/050232
§ 371 (c)(1),
(2) Date: Sep. 19, 2022

(87) PCT Pub. No.: WO2021/188033
PCT Pub. Date: Sep. 23, 2021

(65) Prior Publication Data
US 2023/0208983 A1    Jun. 29, 2023

Related U.S. Application Data

(60) Provisional application No. 62/992,294, filed on Mar. 20, 2020.

(51) Int. Cl.
*G06F 15/173* (2006.01)
*H04L 12/14* (2006.01)
*H04M 15/00* (2006.01)

(52) U.S. Cl.
CPC ........ *H04M 15/66* (2013.01); *H04L 12/1407* (2013.01); *H04M 15/8038* (2013.01)

(58) Field of Classification Search
CPC ............. H04M 15/66; H04M 15/8038; H04L 12/1407
See application file for complete search history.

(56) References Cited

U.S. PATENT DOCUMENTS

| 2009/0291666 | A1 | 11/2009 | Rydnell et al. |
| 2012/0269134 | A1* | 10/2012 | Jin ..................... H04W 36/22 370/328 |

(Continued)

FOREIGN PATENT DOCUMENTS

| CN | 102118789 A | 7/2011 |
| CN | 104170330 A | 11/2014 |

(Continued)

OTHER PUBLICATIONS

"3rd Generation Partnership Project; Technical Specification Group Services and System Aspects; Policy and charging control architecture (Release 16)", 3GPP TS 23.203 V16.2.0, Dec. 2019, 267 pages.

(Continued)

*Primary Examiner* — Joseph R Maniwang
(74) *Attorney, Agent, or Firm* — Murphy, Bilak & Homiller, PLLC

(57) ABSTRACT

According to techniques disclosed herein, a Visited Communication Network (VCN) (10) selectively reports usage information back to a Home Communication Network (HCN) (50) for user traffic that is offloaded at the VCN (10) to a Data Network (DN) (14) rather than routed back to the HCN (50). Among the various advantages, the reporting supports charging operations in the HCN (50) regarding the offloaded traffic. Further advantages include the application of policy control and service-authorization control jointly between the VCN (10) and the HCN (50).

20 Claims, 9 Drawing Sheets

(56) References Cited

U.S. PATENT DOCUMENTS

| | | | |
|---|---|---|---|
| 2019/0098463 A1 | 3/2019 | Chai | |
| 2021/0176622 A1* | 6/2021 | Lauster | ............... H04W 48/14 |
| 2023/0007556 A1* | 1/2023 | Qiao | .................... H04W 36/08 |

FOREIGN PATENT DOCUMENTS

| | | |
|---|---|---|
| CN | 105247903 A | 1/2016 |
| EP | 3580947 A1 | 12/2019 |
| JP | 2016025406 A | 2/2016 |
| WO | 2018167254 A1 | 9/2018 |
| WO | 2019057043 A1 | 3/2019 |
| WO | 2019199311 A1 | 10/2019 |

OTHER PUBLICATIONS

"3rd Generation Partnership Project; Technical Specification Group Services and System Aspects; Policy and charging control framework for the 5G System (5GS); Stage 2 (Release 16) The present", 3GPP TS 23.503 V16.3.0, Dec. 2019, 112 pages.

"3rd Generation Partnership Project; Technical Specification Group Services and System Aspects; Procedures for the 5G System (5GS); Stage 2 (Release 16)", 3GPP TS 23.502 V16.3.0, Dec. 2019, 558 pages.

"3rd Generation Partnership Project; Technical Specification Group Services and System Aspects; Procedures for the 5G System (5GS); Stage 2 (Release 16)", 3GPP TS 23.502 V16.2.0, Sep. 2019, 525 pages.

"3rd Generation Partnership Project; Technical Specification Group Services and System Aspects; Service requirements for the 5G system; Stage 1 (Release 17)", 3GPP TS 22.261 V17.1.0, Dec. 2019, 83 pages.

"3rd Generation Partnership Project; Technical Specification Group Services and System Aspects; Service requirements for the 5G system; Stage 1 (Release 17) The present", 3GPP TS 22.261 V17.0.0, Sep. 2019, 83 bages.

"3rd Generation Partnership Project; Technical Specification Group Services and System Aspects; System architecture for the 5G System (5GS); Stage 2 (Release 16)", 3GPP TS 23.501 V16.3.0, Dec. 2019, 417 pages.

"3rd Generation Partnership Project; Technical Specification Group Services and System Aspects; System Architecture for the 5G System (5GS); Stage 2 (Release 16)", 3GPP TS 23.501 V16.2.0, Sep. 2019, 391 pages.

"3rd Generation Partnership Project; Technical Specification Group Services and System Aspects; Telecommunication management; Charging management; 5G data connectivity domain charging; stage 2 (Release 16)", 3GPP TS 32.255 V16.3.0, Dec. 2019, 88 pages.

\* cited by examiner

METHOD AND NETWORK NODE FOR HOME CHARGING OF OFFLOADED TRAFFIC AT VISITED NETWORK

TECHNICAL FIELD

Methods and apparatuses disclosed herein provide for the reporting of usage information back to a Home Communication Network (HCN) by a Visited Communication Network (VCN), for user traffic offloaded at the VCN.

BACKGROUND

Documents detailing the defining architecture and specifications for Fifth Generation (5G) wireless communication networks include Technical Specification (TS) 23.501 V16.3.0 (2019-12) and TS 23.502 V16.3.0 (2019-12), released by the Third Generation Partnership Project (3GPP). Relevant details for 5G Core (5GC) networks include different "roaming" scenarios—see at least Sections 4.3.6, 4.23.6.3, and 4.23.9 of TS 23.502. Other 3GPP documents of interest include 3GPP TS 22.261 V17.1.0, and 3GPP TS 32.255 V16.3.0.

A first roaming scenario between a Visited Public Mobile Network (VPMN) and a Home PMN (HPMN) involves "home routing" (HR). In an example based on visited and home 5GC networks, user traffic carried by the visited 5GC network for a communication session involving a roaming UE is routed back to the home 5GC network of the UE. HR provides a direct mechanism for the home 5GC network to determine traffic usage for the communication session and carry out corresponding charging operations.

A second roaming scenario does not involve home routing of the user traffic exchanged between the roaming UE and the visited 5GC network. Instead, the visited 5GC network performs a "local breakout" (LBO). With LBO, the visited 5GC network offloads at least some of the user traffic in the communication session to a data network (DN), rather than routing it back to the home 5GC network. Current 3GPP specifications do not define traffic-usage reporting by the visited network back to the home network, for offloaded traffic.

SUMMARY

According to techniques disclosed herein, a Visited Communication Network (VCN) selectively reports usage information back to a Home Communication Network (HCN) for user traffic that is offloaded at the VCN to a Data Network (DN) rather than routed back to the HCN. Among the various advantages, the reporting supports charging operations in the HCN regarding the offloaded traffic. Further advantages include the application of policy and service-authorization control jointly between the VCN and the HCN.

Example embodiments include a Session Management Function (SMF), a Charging Function (CHF), a computer program, and a computer program product, for providing service authorization to a charging client, thereby alleviating at least some of the disadvantages noted above. As a particular example, a Policy Control and Charging Function (PCF) in the VCN or the HCN may provide instructions that indicate whether to perform traffic reporting from the VCN, for user traffic that is offloaded by the VCN to a Data Network (DN) rather than routed back to the HCN. In one embodiment, an SMF in the VCN reports the usage to an SMF or CHF in the HCN. In another embodiment, a CHF in the VCN performs the reporting.

A method of operation by a network node in a VCN includes, according to one or more embodiments, determining that usage information for offloaded traffic shall be reported back to an HCN. The offloaded traffic is user traffic of a communication session that is offloaded to a DN at the VCN rather than routed back to the HCN, and the communication session involves a communication device that is associated with the HCN. The method further includes obtaining addressing information for reporting the usage information back to the HCN and reporting the usage information for the offloaded traffic back to the HCN in accordance with the addressing information, for charging of the communication session in the HCN.

According to another example embodiment, a network node in a VCN includes interface circuitry and processing circuitry. The processing circuitry is configured to determine that usage information for offloaded traffic shall be reported back to an HCN. The offloaded traffic is user traffic of a communication session that is offloaded to a DN at the VCN rather than routed back to the HCN, and the communication session involves a communication device that is associated with the HCN. Further, the processing circuitry is configured to obtain addressing information for reporting the usage information back to the HCN, and report, via the interface circuitry, the usage information for the offloaded traffic back to the HCN in accordance with the addressing information, for charging of the communication session in the HCN.

Further example embodiments will now be described in more detail and with references to the enclosed drawings.

DETAILED DESCRIPTION

Figure 1:
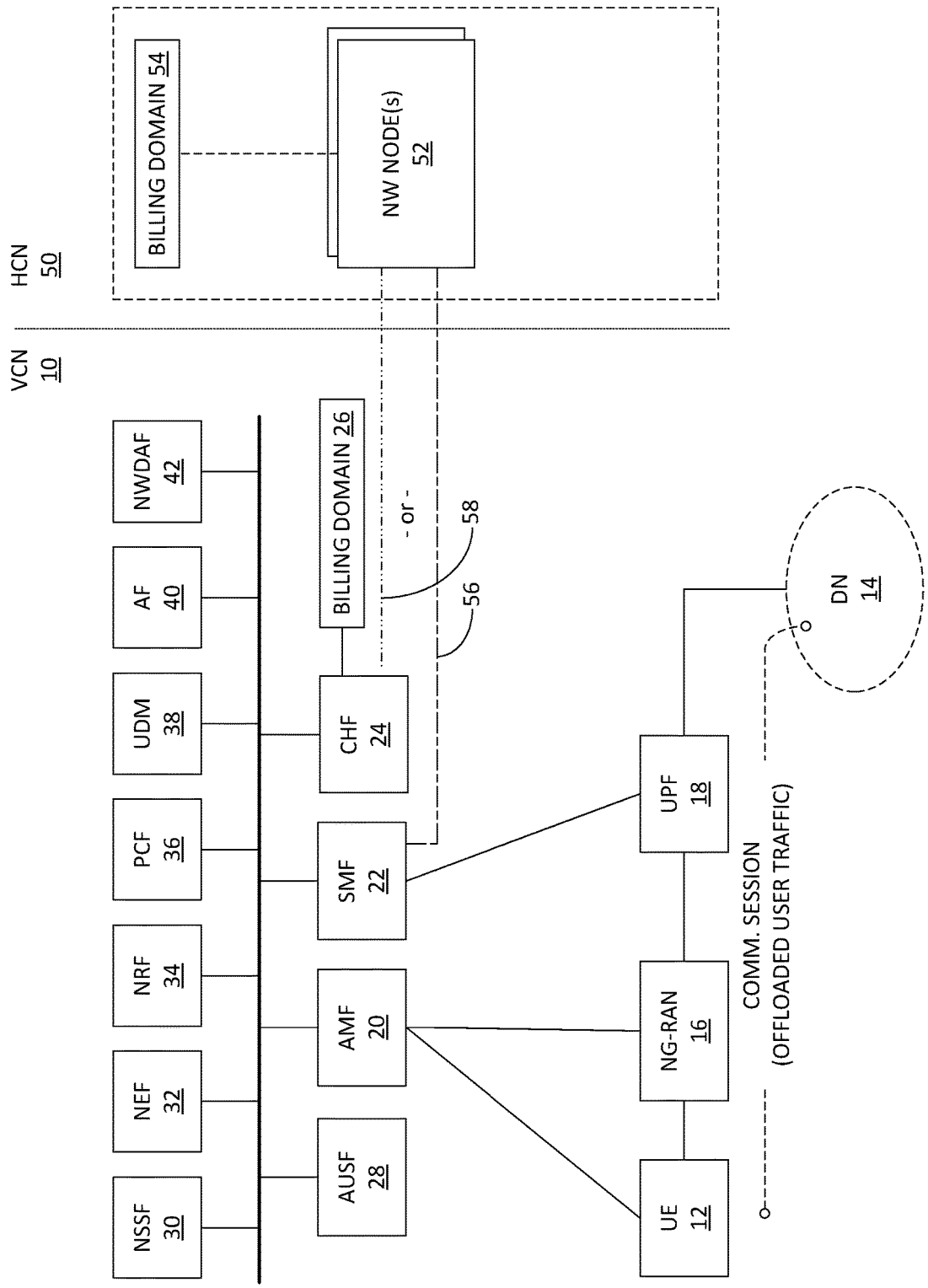
FIG. 1 is a block diagram of one embodiment of a Visited Communication Network (VCN) and a Home Communication Network (HCN).

FIG. 1 illustrates an example of a Visited Communication Network (VCN) 10, also referred to as a Visited Public Mobile Network (VPMN) or a Visited Public Land Mobile Network (VPLMN). The VCN 10 supports a communication session between a User Equipment (UE) 12 and a Data Network (DN) 14. Referring hereafter to the UE 12 as the "communication device 12", the VCN 10 communicatively couples to the communication device 12 via one or more radio links provided by a Radio Access Network (RAN) portion of the VCN 10, illustrated as a Next Generation (NG) RAN 16 in the diagram. The NG designation indicates configuration according to the New Radio (NR) standards developed by the Third Generation Partnership Project (3GPP) for Fifth Generation (5G) communication networks. A network node in the VCN 10 operating as a User Plane Function (UPF) 18 provides the data-network connectivity.

One or more further network nodes of the VCN 10 implement various functions associated with operation of the VCN 10 as a 5G Core (5GC) network. Such functions include an Application Management Function (AMF) 20, a Session Management Function (SMF) 22, a Charging Function (CHF) 24, which couples to a billing domain 26 of the VCN 10. Further example functions include a Network Slice Selection Function (NSSF) 30, a Network Exposure Function (NEF) 32, a Network Repository Function (NRF) 34, a Policy Control Function (PCF) 36, a User Data Management (UDM) 38, an Applicant Function (AF) 40, and a Network Data Analytics Function (NWDAF) 42.

A Home Communication Network (HCN) 50 includes one or more network nodes 52 ("NW NODE(s)" in the diagram), and further includes a billing domain 54. The HCN 50 may also be referred to as a Home Public Mobile Network (HPMN) or a Home Public Land Mobile Network (HPLMN).

Advantageously, the SMF 22 or the CHF 24 in the VCN 10 provides an interface 56 or 58, for selectively reporting usage information for user traffic that is "offloaded" by the VCN 10 rather than routed back to the HCN 50. Here, the communication device 12 is associated with the HCN 50—e.g., via a subscription arrangement—but the communication device 12 is operating outside of the HCN 50 ("roaming") and it uses the VCN 10 to establish a communication session with a DN 14.

In a home-routing scenario, the user traffic conveyed in the communication session is routed through the HCN, e.g., the HCN 50 provides the connection to the DN 14 and the user traffic goes through both the VCN 10 and the HCN 50. Home routing provides direct visibility and charging control by the HCN 50 with respect to the communication session. However, traffic "offloading", also referred to as Local Breakout or LBO, may be used at the VCN 10. With traffic offloading, the VCN 10 connects the communication device 12 to the DN 14 and the user traffic going between the communication device 12 and the DN 14 for the communication session is not routed back through the HCN 50.

In one or more embodiments contemplated herein, the interface 56 or 58 implemented via the SMF 22 or the CHF 24 in the VCN 10 provides for usage reporting by the VCN 10 back to the HCN 50, for offloaded traffic. Such reporting may be selective and undertaken only for offloaded user traffic for which usage reporting back to the HCN 50 is indicated. Further, in at least one contemplated embodiment, the interface 56 or 58 provides for service authorization and policy control for the communication session, based on policy and authorization control agreed between the VCN 10 and the HCN 50.

Figure 2:
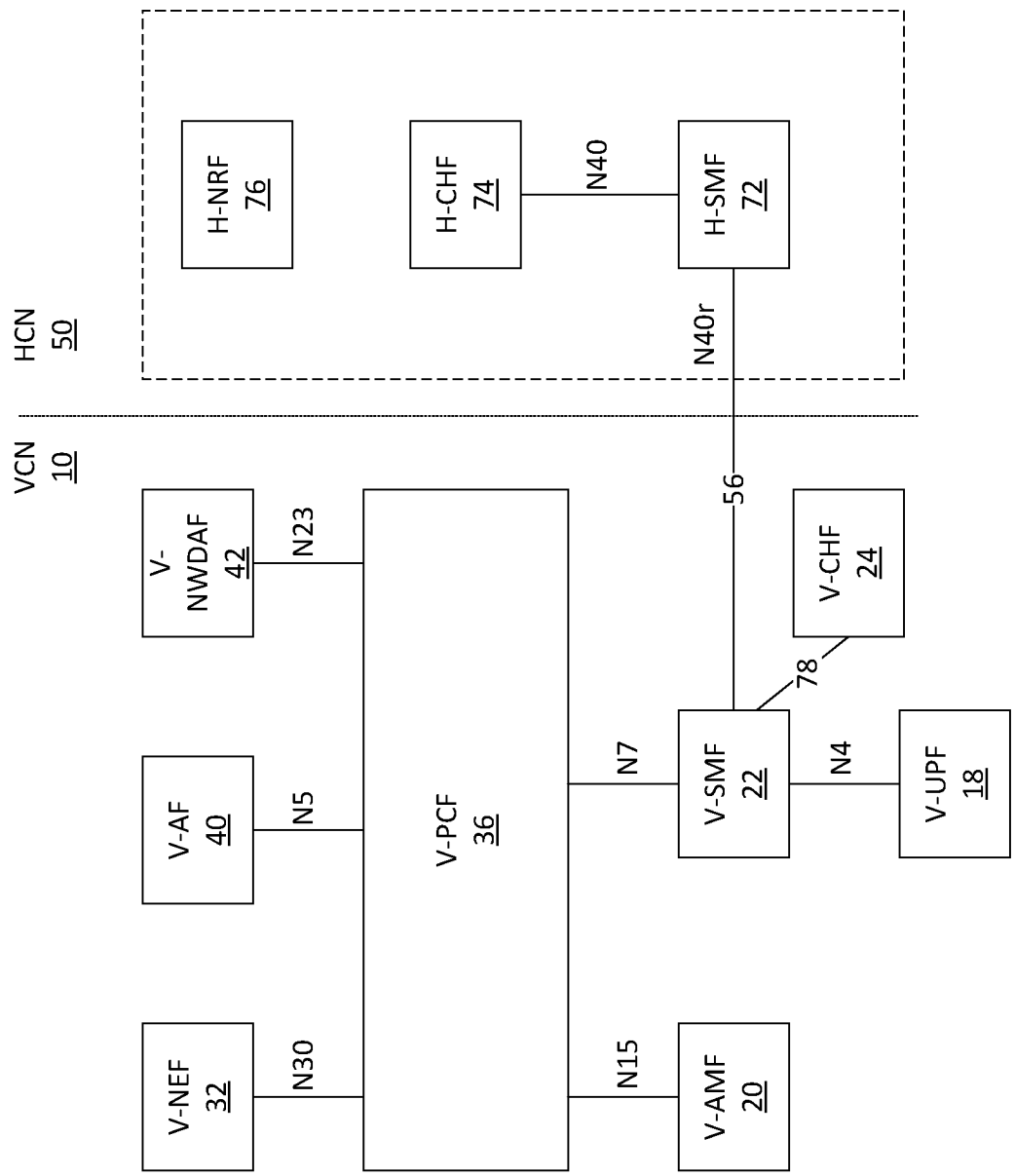
FIGS. 2-5 are block diagrams of example details for the VCN and HCN, according to respective embodiments.

FIG. 2 illustrates an example embodiment using the interface 56. Named functions in the VCN 10 are prepended by a "V" to denote the "Visited" network. Similarly, named functions in the HCN 50 are prepended by an "H" to denote the "Home" network. These visited and home designations are relative to the scenario where a communication device 12 of the HCN 50 is roaming and connects to the VCN 10 for one or more communication services. Further, the illustrated functions in the VCN 10 shall be understood as being implemented on one or more network nodes, e.g., computer systems, and the same understanding holds regarding the illustrated functions in the HCN 50.

In the VCN 10, a V-PCF 36 interfaces to a V-AMF 20, a V-SMF 22, a V-NEF 32, a V-AF 40, and a V-NWDAF 42. See the N15 interface point between the V-PCF 36 and the V-AMF 20, the N7 interface point between the V-PCF 36 and the V-SMF 22, the N30 interface point between the V-PCF 36 and the V-NEF 32, the N5 interface point between the V-PCF 36 and the V-AF 40, and the N23 interface point between the V-PCF 36 and the V-NWDAF 42. Additional interface points include the N4 interface between the V-UPF 18 and the V-SMF 22, and an N40 interface point between an H-SMF 72 and an H-CHF 74 in the HCN 50, which also includes an H-NRF 76. An interface 78 between the V-SMF 22 and the V-CHF 24 supports communications between the V-SMF 22 and the V-CHF 24 in the context of usage-information reporting back to the HCN 50, for offloaded traffic.

Figure 3:
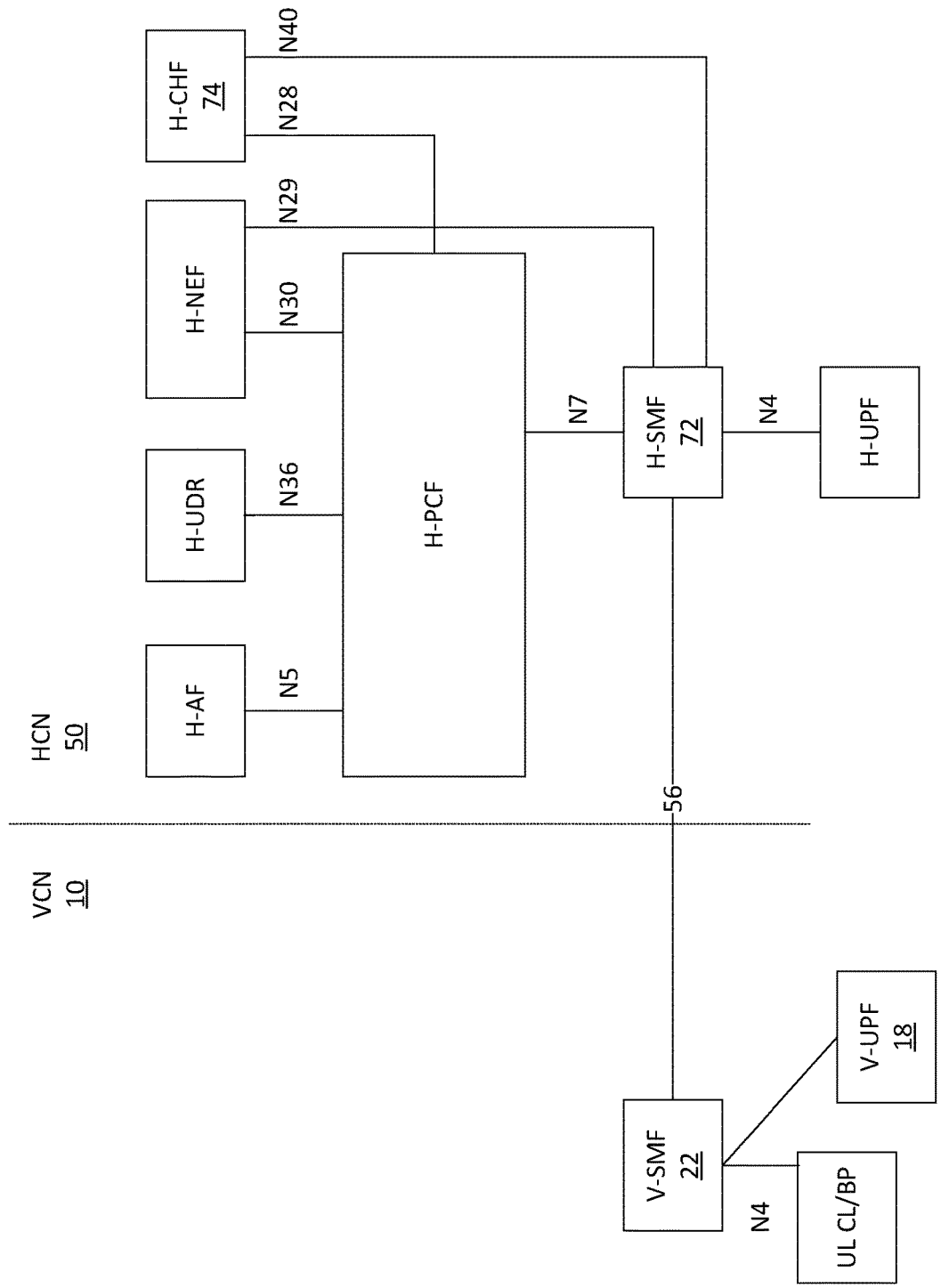

FIG. 3 illustrates additional example details for the VCN 10 and the HCN 50 in relation to FIG. 2. According to the embodiment of FIGS. 2 and 3, usage information for user traffic offloaded at the VCN 10 is reported from the V-SMF 22 to the H-SMF 72 in the HCN 50. In turn, the H-SMF 72 communicates the usage information to the H-CHF 74. In an example, the V-SMF 22 in the VCN 10 determines that usage reporting is to be used for the offloaded traffic based on traffic-steering information in a Policy Control and Charging (PCC) rule. That is, there may be some types of offloaded traffic or some instances of traffic offloading for which usage reporting back to the HCN 50 is not performed by the VCN 10, such that the usage reporting described herein happens on a selective basis, responsive to determining that the offloaded traffic at issue is to be reported.

PCC rules applicable to the communication session in question include Charging Keys that are agreed between the VCN 10 and the HCN 50 or are otherwise set by the VCN 10 on behalf of the HCN 50. Such PCC rules may be provided to the VCN 10 by an H-PCF in the HCN 50. For a communication session of a communication device 12 that has some traffic offloaded at the VCN 10 and some traffic routed to the HCN 50, the V-SMF 22 in the VCN 10 is instructed to report the traffic usage to the H-SMF 72, which reports the usage to the H-CHF 74. In an online charging case, the H-SMF 72 requests quotas from the H-CHF 74 for authorizing corresponding amounts of service consumption for the communication session, and correspondingly provides service-authorization information to the V-SMF 22 in the VCN 10 via the interface 56.

In one or more embodiments, the V-SMF 22 in the VCN 10 receives instructions from the H-PCF via the H-SMF 72 for a service data flow that may be routed through different Data Network Access Identifier (DNAIs). A communication session may contain more than one service data flow, where each service data flow is an aggregate set of packet flows carried through the UPF that match a service data flow template defined in a PCC rule. For DNAIs associated with traffic offloading, the V-SMF 22 reports usage information back to the H-SMF 72.

A PCC rule for AF-influenced traffic steering may be extended, to cause usage information reporting from the VCN 10 back to the HCN 50 for certain user traffic offloaded at the VCN 10. AF-influenced traffic steering enables the routing of the user traffic matching the service data flow templates provided in the PCC rule to a DN identified by a DNAI. An example PCC rule includes the following Information Elements (IEs):

DNAI—identifiers of the target DNs, as defined in Section 5.6.7 in TS 23.501;

Per DNAI traffic steering policy identifier—reference to a pre-configured traffic steering policy at the SMF;

Per DNAI N6 traffic routing information—describes information necessary for traffic steering to the DNAI, see Section 5.6.7 of TS 23.501;

Information on AF subscription to User Plane (UP) change events—indicates whether notifications in case of change of the UP path are requested and optionally indicates whether acknowledgment to the notifications shall be expected, see Section 5.6.7 of TS 23.501;

Indication of traffic usage reporting from V-SMF to H-SMF—indicates whether usage information reporting to the H-SMF is requested in case of change of UP path;

Indication of UE IP address preservation—indicates that the UE IP address should be preserved, see Section 5.6.7 of TS 23.501;

Indication of traffic correlation—indicates that the target Protocol Data Unit (PDU) sessions should be correlated via a common DNAI in the UP, see Section 5.6.7 in TS 23.501.

In the above rule example, the IE used to indicate whether usage information reporting to the H-SMF 72 is requested provides a mechanism for selective or conditional reporting. That is, this IE extends the PCC rule.

Figure 4:
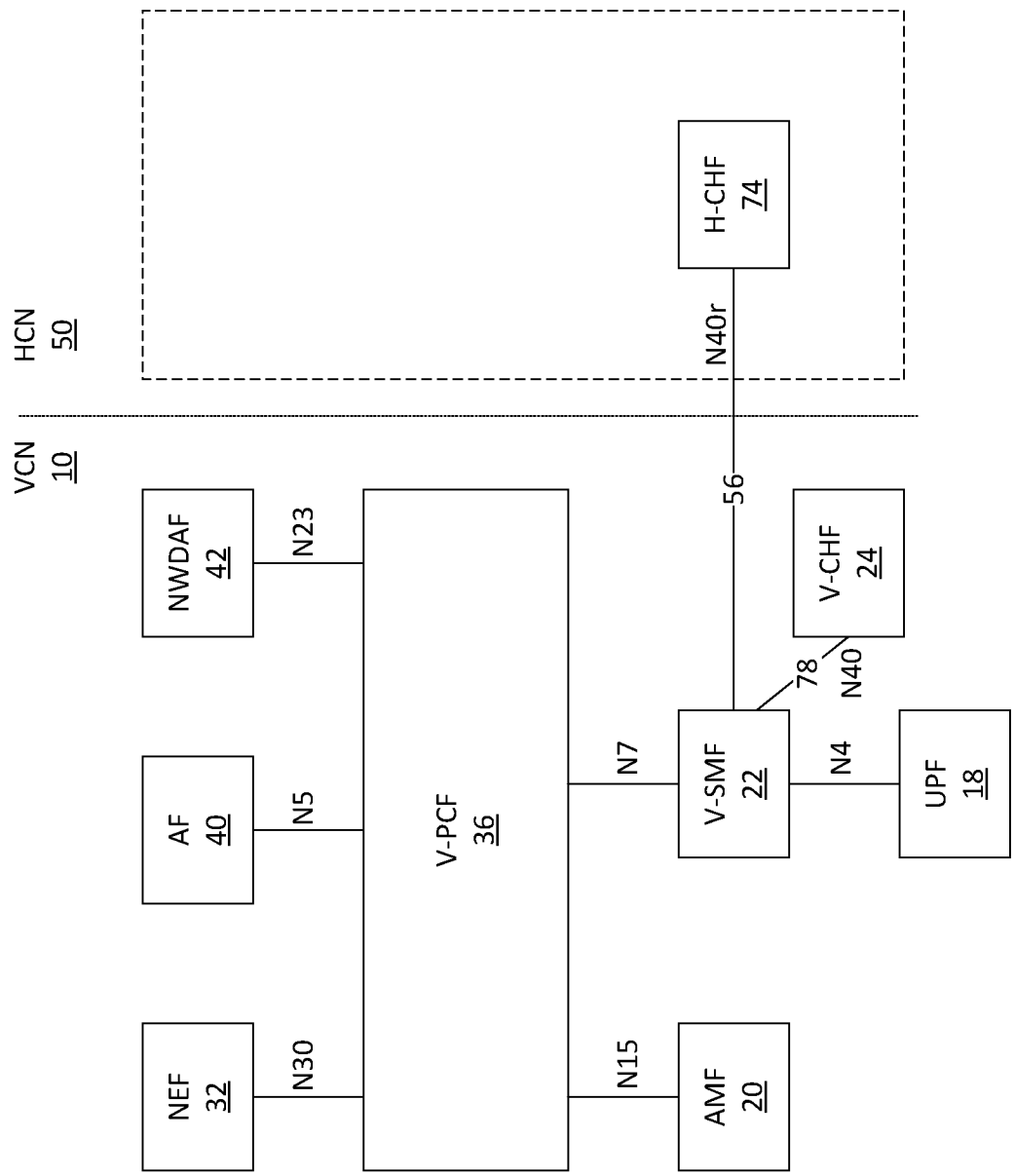

FIG. 4 illustrates another embodiment wherein, in comparison to the embodiment of FIG. 3, the V-SMF 22 reports usage information directly to the H-CHF 74 in the HCN 50. Thus, rather than the interface 56 coupling the V-SMF 22 to the H-SMF 72, the interface 56 in this embodiment communicatively couples the V-SMF 22 to the H-CHF 74 and operates as a "roaming interface" between the V-SMF 22 and the H-CHF 74. FIG. 4 indicates the roaming distinction by labeling the logical interface point between the V-SMF 22 and the H-CHF 74 as "N40r", to differentiate between the conventional interface point N40 that exits between an SMF and a CHF that belong to the same 5GC network. Of course, a new reference point between the V-SMF 22 and H-CHF 74 may be introduced. Regardless, Nchf services are offered by the H-CHF 74 and consumed for the V-SMF 22, where "Nchf" refers to the service-based interface exhibited by the H-CHF 74 according to the 3GPP standards.

The H-CHF address is obtained from any of (i) the V-SMF 22 using the V-NRF 34 and the H-NRF 76 following the procedure defined in Section 4.17.5 of TS 23.502, entitled "NF discovery across PLMNs in the case of discovery made by NF service consumer", (ii) a local configuration in the V-SMF 22 that is based on Subscription Permanent Identifier SUPI ranges or (iii) the V-PCF 36 at the establishment of a Session Management SM Policy association as defined in Section 4.16.4 in TS 23.502. For example, the V-PCF 36 provides the H-CHF address to the V-SMF 22 based on the roaming profile per roaming partner.

PCC rules provided to the V-SMF 22 by the V-PCF 36 include Charging Keys, for example, that are agreed between the HCN 50 and the VCN 10. Charging Keys identify the type of communication service and how to charge for it—see 3GPP TS 23.203 and TS 23.501. Charging Keys for some specific services such as general Mobile Broadband (MBB) may be standardized by GSMA, for example. The term "rating group" may be used rather than "Charging Key"—see 3GPP TS 32.255. The V-SMF 22 supports interfaces 56, 78 to both the H-CHF 74 and the V-CHF 24 for the purpose of charging data collection as defined in TS 23.501. This means that the V-SMF 22 must set up double reporting and usage monitoring for service consumption occurring in the communication session.

Figure 5:
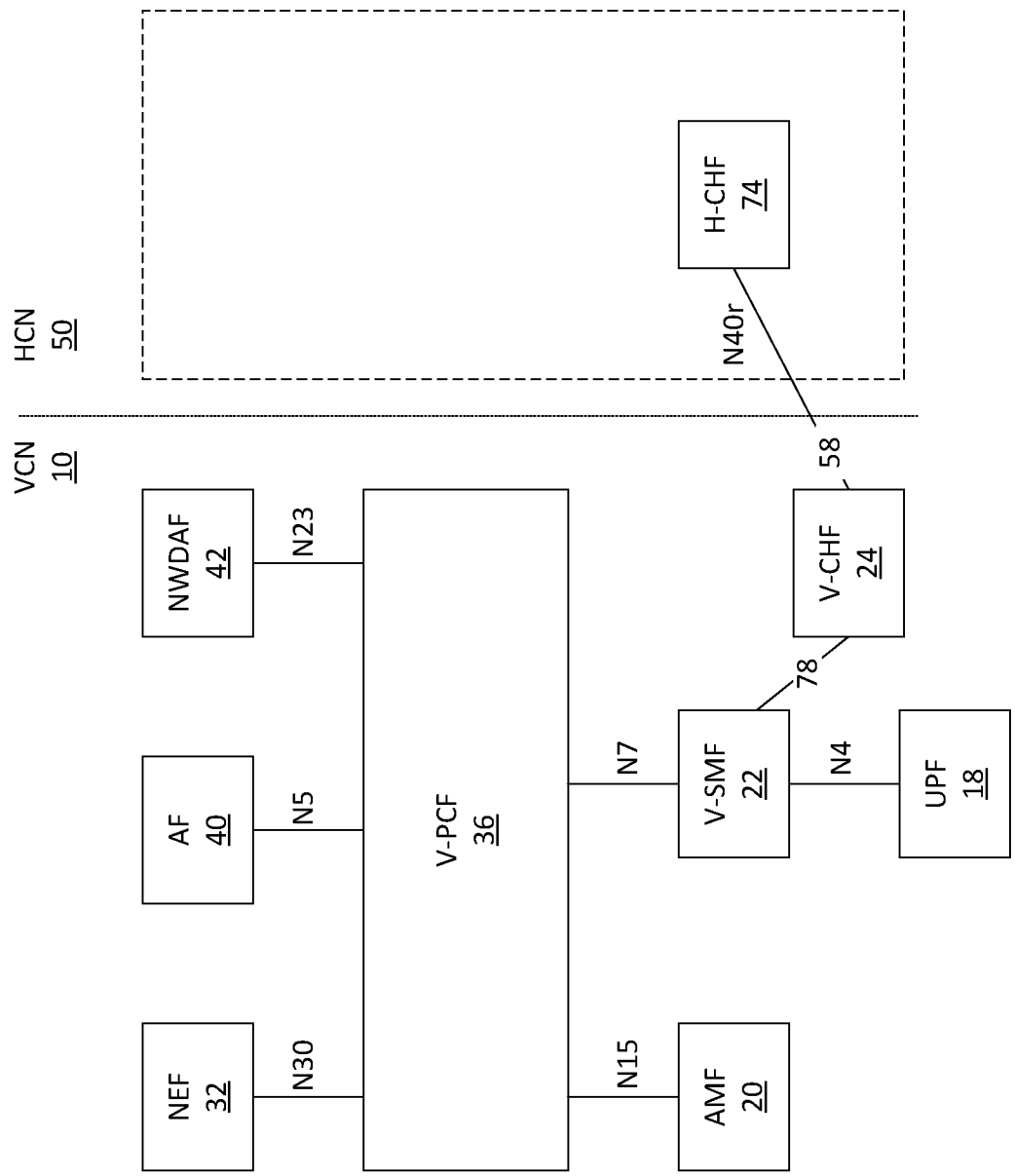

FIG. 5 illustrates another embodiment, wherein the V-CHF 24 reports to the H-CHF 74, as compared to the embodiments of FIGS. 3 and 4, in which the V-SMF 22 operated as the network node in the VCN 10 that reports usage information back to the HCN 10. The interface 58 implemented between the V-CHF 24 and the H-CHF 74 provides communicative coupling between them and may be regarded as an N40r roaming interface.

The address of the H-CHF 74 is obtained from the H-NRF 76 via the V-NRF 34, or by a local configuration at the V-SMF 22 that is based on SUPIs, or it is provided by the V-PCF 36 based on the roaming profile per roaming partner. In example operation, the address of the H-CHF 74 flows to the V-CHF 24 through the V-SMF 22, such as part of the V-SMF 22 providing PCC rules or information derived therefrom, based on the V-PCF 36 providing the PCC rules to the V-SMF 22. The PCC rules provided by the V-PCF 36 may include Charging Keys known to the VCN 10. The V-CHF 24 performs a mapping of the Charging Keys known to the VCN 10 to the Charging Keys known by the HCN 50. For example, the V-CHF 24 can map a Charging Key of the HCN 50 to a Charging Key of the VCN 10 as long as the VCN/HCN Charging Keys have the same meanings, and also in cases where the VCN 10 has Charging-Key definitions that are more granular than those used in the HCN 50.

In a scenario involving online charging of a communication session that involves offloaded traffic for which usage information is to be reported from the VCN 10 to the HCN 50, the V-CHF 24 requests service quotas for authorizing consumption of the communication service represented by the communication session. Such requesting happens per Charging Key from the H-CHF 74, and the V-CHF 24 provides authorized quotas to the V-SMF 22, to support service consumption by the communication device 12. Further, the V-CHF 24 in such embodiments combines the VCN and HCN charging triggers applicable to the communication session, to fulfill the trigger requirements for the H-CHF 74 and the V-CHF 24.

In at least one embodiment, the V-PCF 36 provides rules to V-SMF 22, indicating that usage reporting is required for at least some offloaded traffic of a communication session that involves a visiting communication device 12—i.e., a communication device 12 that is associated with another communication network as a home network of that device. In one or more embodiments, the V-SMF 22 in the VCN 10 implements the reporting and sends the usage information to an H-SMF 72 in the HCN 50. Alternatively, the V-SMF 22 sends the usage information directly to an H-CHF 74 in the HCN 50, rather than reporting it to the H-SMF 72. In still other embodiments, the V-CHF 24 rather than the V-SMF 22 performs the usage. In such embodiments, information indicating when and how to perform the usage reporting may flow to the V-CHF 24 from the V-PCF 36, via the V-SMF 22.

Figure 6:
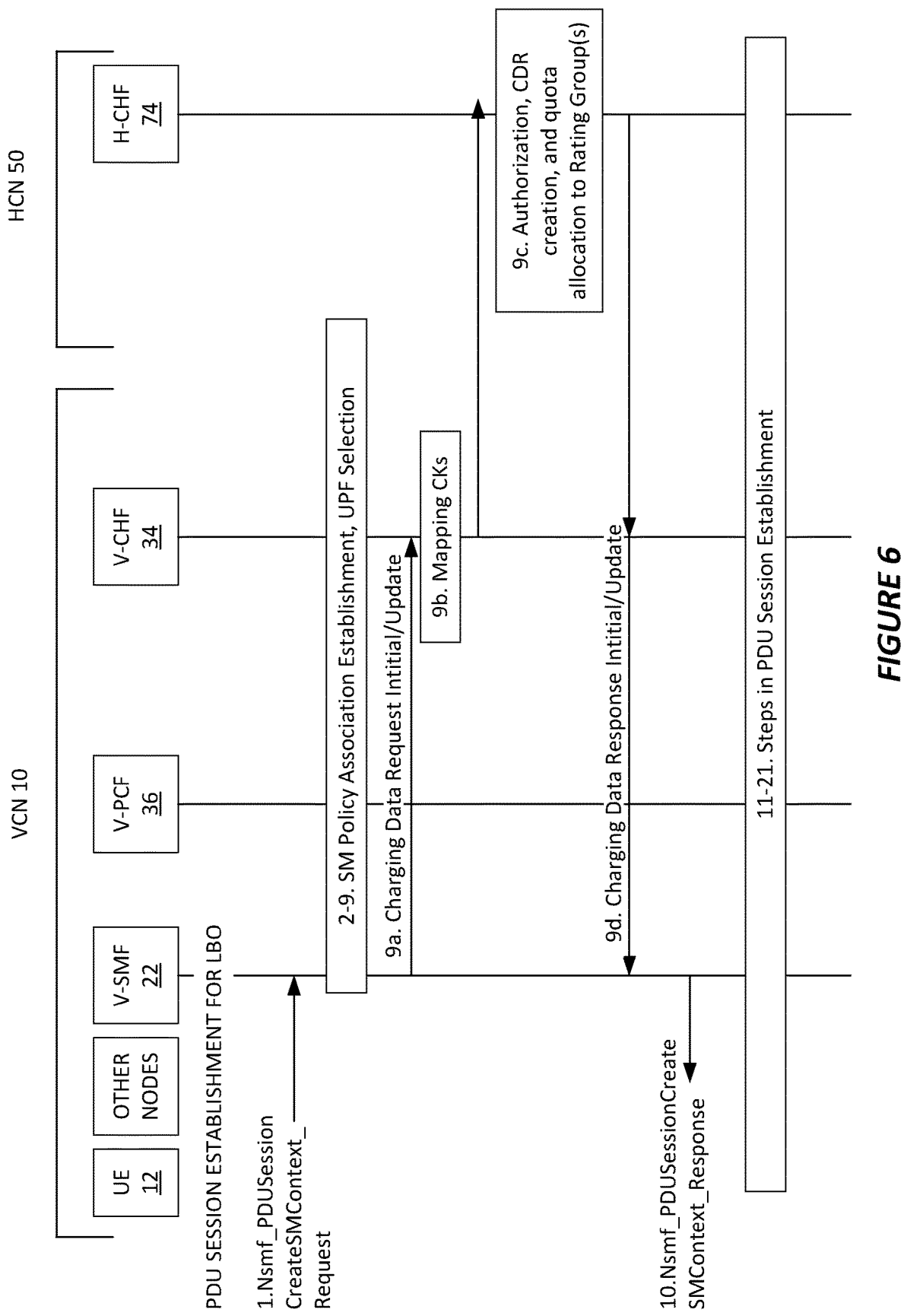
FIGS. 6 and 7 are signal flow diagrams of example signaling between a VCN and an HCN.

FIG. 6 is a signal flow diagram according to one embodiment. The diagram illustrates example signaling for a Charging Data Request and Update for a Protocol Data Unit (PDU) session that involves user traffic offloaded at the VCN 10 and other user traffic that is routed back to the HCN 50. The signaling flow provides for a PDU session establishment procedure for LBO, according to the VCN/HCN implementation depicted in FIG. 5.

Steps 1-8 describes PDU session establishment as defined in Section 4.3.2.2.1 of TS 23.502, for the non-roaming case. In Step 9a, the V-SMF 22 finds the address of the V-CHF 24 based on VPLMN Id or SUPI ranges locally configured or based on CHF addresses received from the V-PCF 36 or via NRF discovery. The V-SMF 22 sends an initial Charging Data Request to the V-CHF 24 and then, in Step 9b, the V-CHF 24 maps the Charging Key (CK) in the VCN 10 to the Charging Key in the HCN 50 and finds the H-CHF 74 in the HCN 50, based on local configuration information, or based on NRF information received from the V-SMF 22.

The H-CHF 74 may further include a transaction Id that may be used to confirm that the reported units have been stored by the H-CHF 74. This transaction Id can be linked or contain the used units and the communication session it relates to. The transaction id can then be stored in the V-CHF 24 for later accounting purposes.

At Step 9c, the H-CHF 74 allocates a quota, Charging Data Records (CDRs) are opened, and a Charging ID is assigned. In steps 10-21 the PDU session establishment follows, as defined in Section 4.3.2.2.1 of TS 23.502 for the non-roaming case.

Various embodiments described herein may encompass the advantage of allowing the HCN 50 to have an improved overview of traffic usage, for traffic offloaded to a DN 14 at a VCN 10, for a communication session involving the VCN 10 and a communication device 12 associated with the HCN 50. Example advantages include:

- recording of charging information in the HCN 50 for traffic only visible to the VCN 50, including traffic usage for edge breakouts in the VCN 10, as a type of LBO;
- comparing the traffic usage in the VCN 10 prior to the roaming interconnect with the HCN 50, with the traffic usage after the roaming interconnect (to determine whether traffic was inserted or removed); and
- allowing traffic reporting to control the total allowed usage by the H-PCF 76, in addition to providing for usage monitoring.

Figure 7:
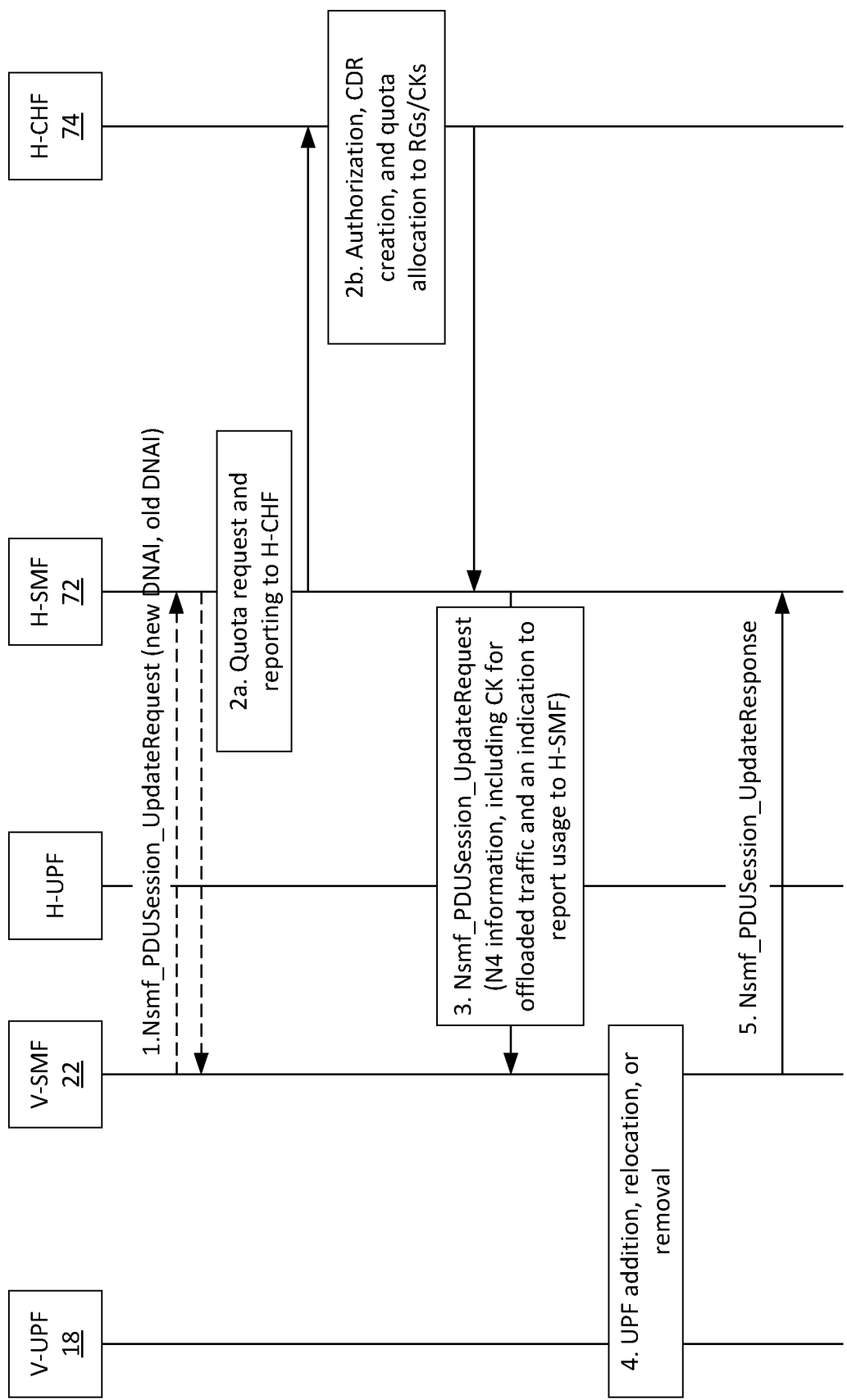

FIG. 7 illustrates an example signaling flow for carrying out a procedure to request a service quota for traffic offloaded at the VCN 10, according to one or more embodiments. At Step 1a, the V-SMF 22 reports to the H-SMF 72 the list of supported DNAIs. The H-SMF 72 decides to instruct the V-SMF 22 to route a service data flow to a DNAI that is controlled by the V-SMF 22. At Step 2a, the H-SMF 72 may request quota for the CK for the service data flow, and report that a change of DNAI (or UPF) will happen.

At Step 2b, the H-SMF 72 performs authorization, performs Charging Data Record (CDR) creation, and performs quota allocation to Ratings Groups (RGs)/Charging Keys (CK). A Converged Charging System (CCS) of the HCN 50 provides the quota at issue.

At Step 3, the H-SMF 72 provides N4 rules, including the quota per CK and an indication that the traffic usage is to be reported to the H-SMF 72. Step 4 involves UPF addition, relocation, or removal. At Step 5, the V-SMF 22 sends an Nsmf_PDUSession_UpdateResponse message to the H-SMF 72.

Turning to other considerations, for purposes of explanation and not limitation, specific details set forth herein, such as particular nodes, functional entities, techniques, protocols, standards, etc., are provided to facilitate an understanding of the described technology. It will be apparent to one skilled in the art that other embodiments may be practiced apart from the specific details disclosed below. In other instances, detailed descriptions of well-known methods, devices, techniques, etc., are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in a non-transitory computer readable medium and so executed by a computer or processor, whether or not such computer or processor is explicitly shown.

The functions of the various elements including functional blocks, including but not limited to those labeled or described as "computer", "processor" or "controller" may be provided through the use of hardware such as circuit hardware and/or hardware capable of executing software in the form of coded instructions stored on computer readable medium. Thus, such functions and illustrated functional blocks are to be understood as being hardware-implemented and/or computer-implemented, (e.g., machine-implemented).

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

In terms of computer implementation, a computer is generally understood to comprise one or more processors, or one or more controllers, and the terms computer and processor and controller may be employed interchangeably herein. When provided by a computer, processor, or controller, the functions may be provided by a single dedicated computer, processor, or controller, by a single shared computer, processor, or controller, or by a plurality of individual computers, processors, or controllers, some of which may be shared or distributed. Moreover, use of the term "processor" or "controller" shall also be construed to refer to other hardware capable of performing such functions and/or executing software, such as the example hardware recited above. The term "processing circuitry" shall cover all such possibilities.

The technology may be used in any type of cellular radio communications (e.g., GSM, CDMA, 3G, 4G, etc.). For ease of description, the term UE and the alternative term "communication device" encompass any kind of radio communications terminal/device, mobile station (MS), PDAs, cell phones, laptops, etc.

Figure 8:
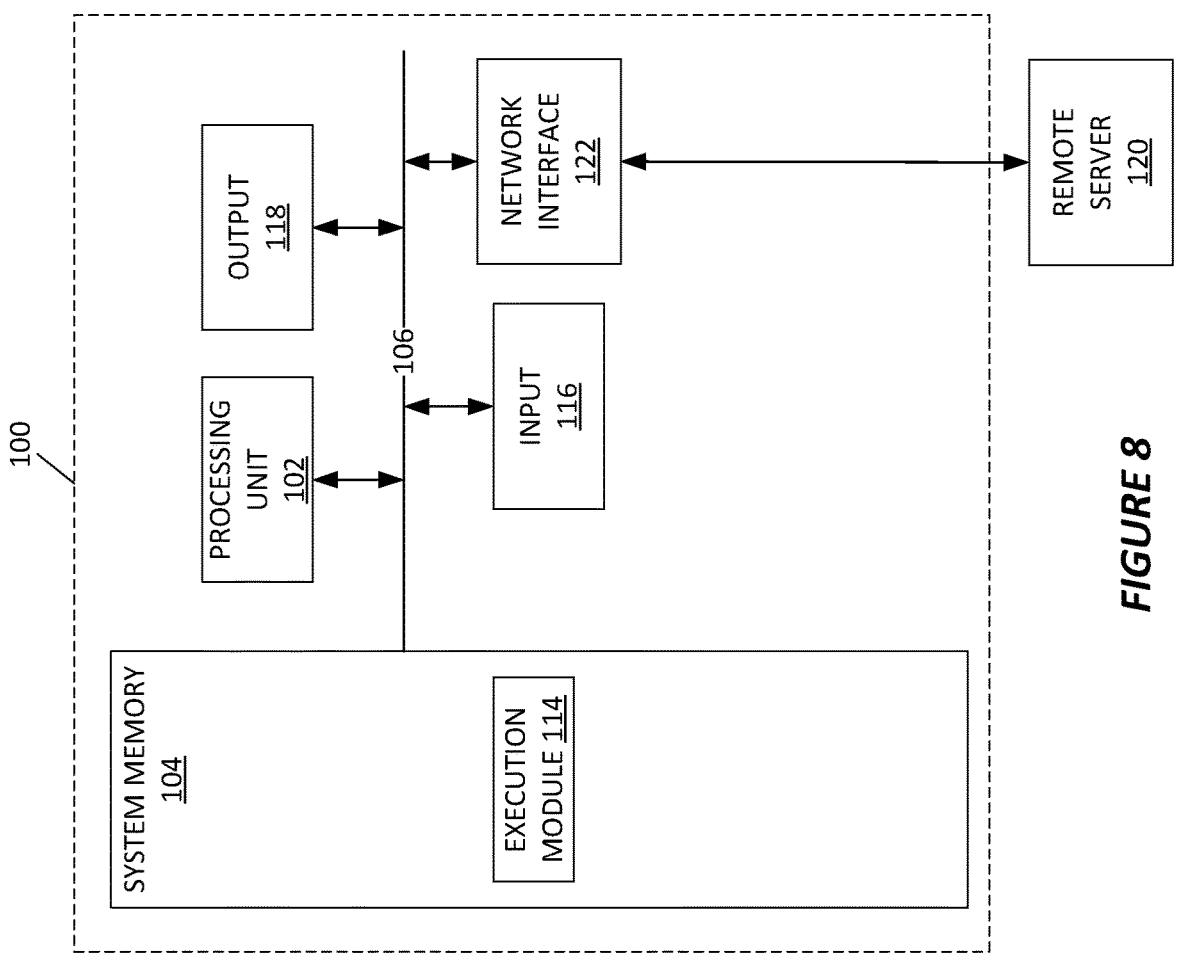
FIG. 8 is a block diagram of one embodiment of a network node operative in a VCN as a V-SMF, or a V-CHF, or a V-PCF, for example.

With the foregoing "computer" implementation flexibility in mind, FIG. 8 is a block diagram illustrating a network node 100 according to one or more embodiments, wherein the network node 100 implements any one or more of the functions detailed herein for the VCN 10. For example, in one or more embodiments, an instance of the network node 100 is configured for operation as a V-SMF 22 in a VCN 10, another instance of the network node 100 is operative as a V-CHF 24 in the VCN 10, and yet another instance of the network node 100 is operative as a V-PCF 36 in the VCN 10. Of course, a given instance of the network node 100 may implement more than one function and different instances of the network node 100 may be configured to implement different functions based on executing different computer programs.

Thus, the network node 100 may also be understood as a computing system environment that is configurable according to the particular computer program instructions executed in the computing system environment. However, the illustrated computing system environment is only one example of a suitable computing environment and is not intended to suggest any limitation as to the scope of use or functionality of the subject matter disclosed herein. Further, the computing system environment shown is not intended to suggest any dependency or requirement relating to the disclosed subject matter and any one or combination of components illustrated in the computing system environment.

Illustrated components of the network node 100 include a processing unit 102, a system memory 104, and a system bus 106 that couples various system components including the system memory 104 to the processing unit 102. The system bus 106 can be any of several types of bus structures including a memory bus or memory controller, a peripheral bus, and a local bus using any of a variety of bus architectures.

The example network node 100 may include or access a variety of transitory and non-transitory computer readable media. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media examples include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information, and which can be accessed by the processing unit 102. Communication media can embody computer readable instructions, data structures, program modules or other data in a modulated data signal such as a carrier wave or other transport mechanism and can include any suitable information delivery media.

Figure 9:
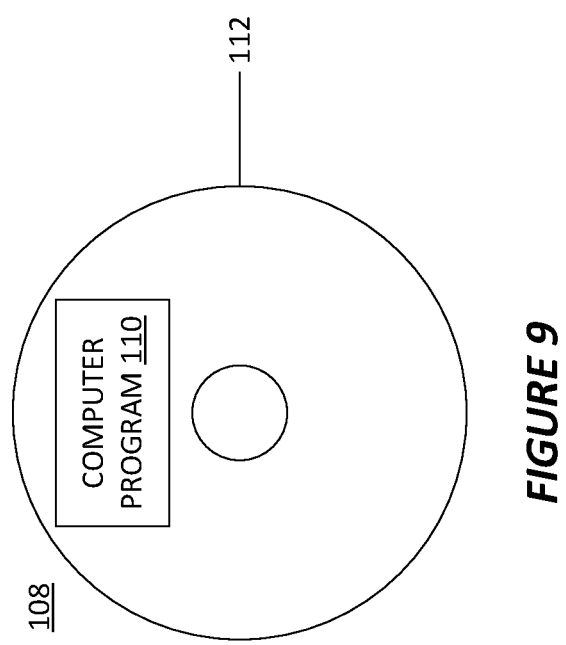
FIG. 9 is a block diagram of a computer program product according to one embodiment.

Turning to FIG. 9 momentarily, a computer program product 108 comprises a computer program 110 embodied in a computer readable medium 112, such as a disk. The network node 100 may be configured to operate as a V-SMF 22, a V-CHF 24, or a V-PCF 36, according to the particulars of the computer program 110 loaded or otherwise stored in the network node 100 for execution by the processing unit 102. The processing unit 102 may be a digital signal processor, a microprocessor, or other digital processing circuitry and is also referred to as processing circuitry 102.

The system memory 104 can include computer storage media in the form of volatile and/or nonvolatile memory such as read only memory (ROM) and/or random access memory (RAM). A basic input/output system (BIOS), containing the basic routines that help to transfer information between elements within network node 100, such as during start-up, can be stored in the system memory 104. Further, the system memory 104 can also contain data and/or program modules that are immediately accessible to and/or presently being operated on by processing unit 102. By way of non-limiting example, the system memory 104 can also include an operating system, application programs, other program modules, and program data.

The system memory 104 may include a software module loaded in the memory and processable by the processing unit 102, or other circuitry which causes the network node 100 to carry out the V-SMF, V-CHF, or V-PCF operations described herein, for enabling and performing usage information reporting for user traffic offloaded at the VCN 10.

In particular, the system memory 104 may include an execution module 114 that is executed by the processing unit 102 or other processing circuitry of the network node 100, which causes the network node 100 to perform the V-SMF or the V-CHF functions described herein.

The network node 100 can also include other removable/non-removable and volatile/nonvolatile computer storage media. For example, network node 100 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 106 through a non-removable memory interface such as an interface, and a magnetic disk drive or optical disk drive can be connected to the system bus 106 by a removable memory interface, such as an interface.

A user can enter commands and information into the network node through input devices such as a keyboard or a pointing device such as a mouse, trackball, touch pad, and/or another pointing device. Other input devices can include a microphone, joystick, game pad, satellite dish, scanner, or similar devices. These and/or other input devices can be connected to the processing unit 102 through a user input interface 116 that is coupled to the system bus 106 but can be connected by other interface and bus structures, such as a parallel port, game port or a universal serial bus (USB).

A graphics subsystem can also be connected to the system bus 106. In addition, a monitor or other type of display device can be connected to the system bus 106 through an output interface 118, which can in turn communicate with video memory. In addition to a monitor, other peripheral output devices may be coupled via the output interface 118, such as speakers and/or printing devices.

The network node 100 can operate in a networked or distributed environment using logical connections to one or more other computing systems, such as a remote server 120, which can in turn have media capabilities different from the network node 100. The remote server 120 can be a personal computer, a server, a router, a network PC, a peer node in the VCN 10 or another common network node, and/or any other remote media consumption or transmission device and can include any or all of the elements described above relative to the network node 100.

Interface circuitry 122 of the network node 100 may be configured for interfacing the network node 100 to a local area network (LAN) or a wide area network (WAN) and is labeled in the drawing as a network interface. The interface circuitry 122 may be used to communicatively couple the network node 100 to one or more other network nodes 100 in the VCN 10 and/or to one or more network nodes 52 in the HCN 10. Of course, such connections may be indirect and involve intermediary nodes/connections.

When used in a LAN networking environment, the interface circuitry 122 includes a LAN network interface or adapter. When used in a WAN networking environment, the interface circuitry 122 includes a communications component, such as a modem, or other means for establishing communications over a WAN, such as the Internet. Additionally, or alternatively, communications component, such as a modem, which can be internal or external, can be connected to the system bus 106 through the user input interface at input 116 and/or other appropriate mechanism.

In a networked environment, program modules depicted relative to the network node 100, or portions thereof, can be stored in a remote memory storage device. It should be noted that the network connections shown and described are exemplary and other means of establishing a communications link between nodes can be used.

Using FIG. 8 for example reference, a network node 100 in a VCN 10 includes interface circuitry 122 and processing circuitry 102. The processing circuitry 102 is configured to determine that usage information for offloaded traffic shall be reported back to an HCN 50. The offloaded traffic is user traffic of a communication session that is offloaded to a DN 14 at the VCN 10 rather than routed back to the HCN 50. The communication session involves a communication device 12 that is associated with the HCN 50. The processing circuitry 102 is further configured to obtain addressing information for reporting the usage information back to the HCN 50, and report, via the network interface 122, the usage information for the offloaded traffic back to the HCN 50 in accordance with the addressing information, for charging of the communication session in the HCN 50.

In at least one embodiment, or in an example operating scenario, the charging is online charging, and the processing circuitry 102 is configured to request a quota that grants a certain amount of service consumption for the communication session, and monitor service consumption for the communication session against the quota.

The VCN 10 and the HCN 50 are 5GC networks in one or more embodiments. Further, in one or more embodiments, the communication session is a PDU session providing a logical connection between the communication device 12 and the DN 14.

In one or more embodiments, the network node 100 is operative as a V-SMF 22 with respect to the communication session and the processing circuitry 102 is configured to report the usage information to a network node 52 in the HCN 50 that is operative as an H-SMF 72 or operative as an H-CHF 74 in the HCN 50. Further, in at least one such embodiment, the processing circuitry 102 is configured to obtain the addressing information from one of: another network node 100 in the VCN 10 that is operative as a V-NRF 34, a network node 52 in the HCN 50 that is operative as an H-NRF 76, another network node 100 in the VCN 10 that is operative as a V-PCF 36, or local configuration information relevant to a SUPI associated with the communication device 12.

In at least one embodiment where the network node 100 in the VCN 10 that reports the usage information back to the HCN 50 is the V-SMF 22, the processing circuitry 102 is configured to obtain PCC rules from a V-PCF 36 in the VCN 10. Correspondingly, the processing circuitry 102 uses the PCC rules in supporting the communication session, wherein the PCC rules are agreed between PCC rules applicable to the communication session in the VCN 10 and PCC rules applicable to the communication session in the HCN 50.

In at least one such embodiment, the processing circuitry 102 is configured to determine that the DN 14 has a DNAI that was indicated in policy information provided to the V-SMF 22 by a V-PCF 36 in the VCN 10.

Further, in at least one embodiment, the processing circuitry 102 is configured to obtain an address for communicating with a network node 52 in the HCN 50 that is operative as an H-CHF 74 that performs charging operations in the HCN 50 for the communication session, according to the usage information reported for the offloaded traffic. The processing circuitry 102 in such embodiments is configured to output the usage information towards the H-CHF 74 via the network interface 122.

In embodiments where the network node 100 is operative as the V-SMF 22, the processing circuitry 102 may be further configured to maintain interfaces 56, 78 towards the H-CHF 74 in the HCN 50 and a V-CHF 24 in the VCN 10. The processing circuitry 102 is configured to use the two interfaces for obtaining service authorizations for the communication session from the V-CHF 24 and the H-CHF 74, and for reporting the usage information to the V-CHF 24 and the H-CHF 74. Usage information reported to the H-CHF 74 comprises usage information for user traffic of the communication session that is offloaded at the VCN 10, and for which reporting to the HCN 50 is indicated.

Responses from H-CHF 74 to the V-SMF 22 may be hashed and the processing circuitry 102 or other circuitry within the network node is configured to process the hashed responses via a corresponding hash function or hash table, to recover the original responses.

In one or more other embodiments, the network node 100 that reports usage information back to the HCN 50 is operative as a V-CHF 24 in the VCN 10 with respect to the communication session. For reporting the usage information in such embodiments, the processing circuitry 102 is configured to report the usage information to a network node 52 in the HCN 50 that is operative as an H-CHF 74 in the HCN 50. In at least one such embodiment, the processing circuitry 102 is configured to maintain an interface 58 with the H-CHF 74. Here, and elsewhere, the processing circuitry 102 "maintaining" or "providing" an interface involves communicative coupling of the involved nodes/entities and denotes the processing circuitry 102 performing processing and signaling for communication with the other involved entity/node.

Further, in at least one such embodiment, the processing circuitry 102 is configured to obtain the addressing information from another network node 100 in the VCN 10 that is operative in the VCN 10 as a V-NRF 34 or operative as a V-SMF 22, with respect to providing session management for the communication session. Further, in at least one such embodiment, the processing circuitry 102 is configured to perform service authorization with respect to the communication session at least in part according to authorization decisions made by the H-CHF 74 in the HCN 50. Still further, in at least one such embodiment the processing circuitry 102 is configured to generate charging information for the communication session in joint dependence on PCC rules used by the VCN 10 and PCC rules used by the HCN 50.

In one or more embodiments, the H-CHF 74 in the HCN 50 provides a return response or responses that include a transaction Id that may be used to confirm that the reported units indicated in the reported usage information have been stored by the H-CHF 74. The transaction Id can be linked or contain the used units and the communication session it relates to, and the transaction Id can then be stored in the V-CHF 24 for later accounting purposes. In cases where a V-SMF 22 in the VCN 10 reports the usage information back to the HCN 10, the processing circuitry 102 in the network node 100 operating as the V-SMF 22 is configured to provide the responses/transaction Id to the involved V-CHF 24 in the VCN 10, for storage. In cases where a V-CHF 24 in the VCN 10 reports the usage information back to the HCN 10, the processing circuitry 102 in the network node 100 operating as the V-CHF 24 is configured to receive the responses/transaction Id and perform the storage, accordingly.

Figure 10:
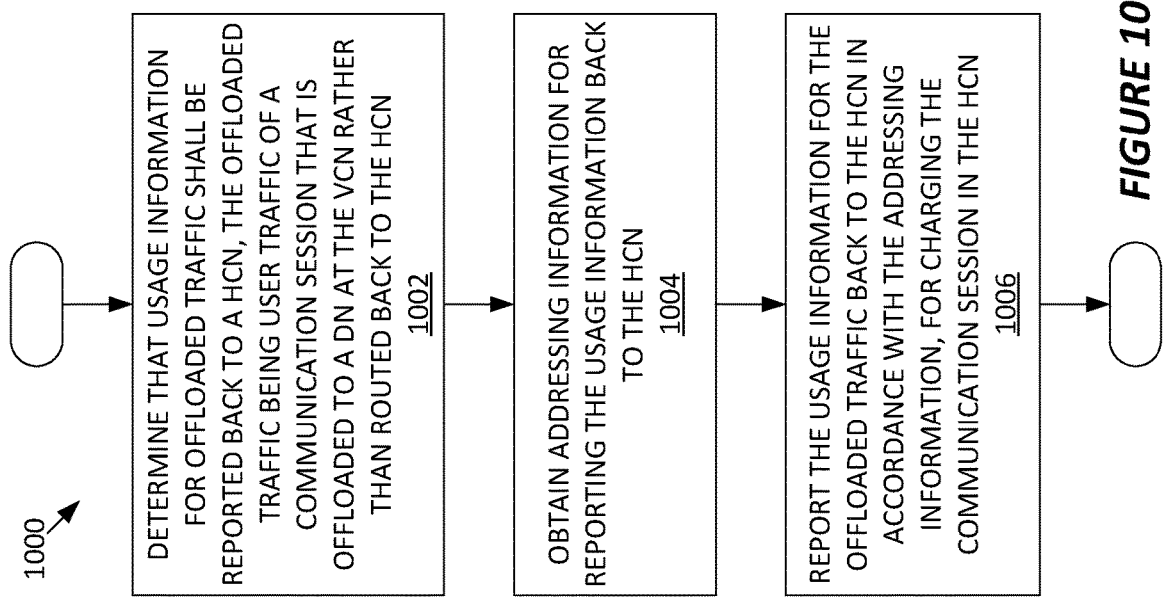
FIG. 10 is a logic flow diagram of one embodiment of a method of operation by a network node in a VCN.

FIG. 10 illustrates one embodiment of a method 1000 of operation by a network node 100 in a VCN 10. The method 1000 includes determining (Block 1002) that usage information for offloaded traffic shall be reported back to an HCN 50, the offloaded traffic being user traffic of a communication session that is offloaded to a DN 14 at the VCN 10 rather than routed back to the HCN 50, and the communication session involving a communication device 12 that is associated with the HCN 50. The method 1000 further includes obtaining (Block 1004) addressing information for reporting the usage information back to the HCN 50, and reporting (Block 1006) the usage information for the offloaded traffic back to the HCN 50 in accordance with the addressing information, for charging of the communication session in the HCN 50. The addressing information indicates, for example, a network address or other information for contacting the network node (52) in the HCN 50 that is the target for the VCN's reporting and indicates the type of network function implemented by the targeted network node 52, e.g., that the targeted network node 52 operates as an SMF or a CHF in the HCN 50.

In an example scenario, the charging is online charging, and the method 1000 further comprises the network node 100 requesting a quota that grants a certain amount of service consumption for the communication session, and monitoring service consumption for the communication session against the quota.

In one or more embodiments of carrying out the method 1000, the VCN 10 and HCN 50 are 5GC networks. Further, in one or more embodiments, the communication session is a PDU session providing a logical connection between the communication device 12 and the DN 14.

In one or more embodiments, the network node 100 that performs the method 1000 is operative as a V-SMF 22 in the VCN 10 with respect to the communication session. Reporting (Block 1006) the usage information comprises the V-SMF 22 reporting the usage information to a network node 52 in the HCN 50 that is operative as an H-SMF 72 or operative as an H-CHF 74 in the HCN 50. In at least one such embodiment, obtaining (Block 1004) the addressing information comprises obtaining the addressing information from one of: another network node 100 in the VCN 10 that is operative as a V-NRF 34, a network node 52 in the HCN 50 that is operative as an H-NRF 76, another network node 100 in the VCN 10 that is operative as a V-PCF 36, or local configuration information relevant to a SUFI associated with the communication device 12.

Further, in at least one embodiment of the V-SMF 22 performing the method 1000, the V-SMF 22 obtains PCC rules from a V-PCF 36 in the VCN 10, for use in supporting the communication session. Advantageously, the PCC rules are agreed between PCC rules applicable to the communication session in the VCN 10 and PCC rules applicable to the communication session in the HCN 50.

Still further, in at least one embodiment of the V-SMF 22 performing the method 1000, determining (Block 1002) that the usage information shall be reported back to the HCN 50 comprises the V-SMF 22 determining that the DN 14 has a DNAI indicated in policy information provided to the V-SMF 22 by a V-PCF 36 in the VCN 10. Still further, in one or more embodiments, obtaining (Block 1004) the addressing information comprises the V-SMF 22 obtaining an address for communicating with a network node 52 in the HCN 50 that is operative as an H-CHF 74 that performs charging operations in the HCN 50 for the communication session according to the usage information reported for the offloaded traffic. Reporting (Block 1006) the usage information comprises the V-SMF 22 reporting the usage information to the H-CHF 74.

For one or more such embodiments of the method 1000, the method 1000 includes the V-SMF 22 maintaining interfaces 56, 78 towards the H-CHF 74 in the HCN 50 and a V-CHF 24 in the VCN 10. The V-SMF 22 uses the interfaces 56, 78 for obtaining service authorizations for the communication session from the V-CHF 24 and the H-CHF 74, and for reporting the usage information to the V-CHF 24 and the H-CHF 74.

In one or more other embodiments, the network node 100 in the VCN 10 that performs the method 1000 is operative as a V-CHF 24 with respect to the communication session. Here, reporting (Block 1006) the usage information comprises the V-CHF 24 reporting the usage information to a network node 52 in the HCN 50 that is operative as an H-CHF 74 in the HCN 50. For reporting (Block 1006) the usage information includes, for example, the V-CHF (24) maintains an interface 58 with the H-CHF 74.

Further, one or more embodiments of the method 1000 includes the V-CHF 24 obtaining the addressing information from another network node 100 that is operative in the VCN 10 as a V-NRF 34 or operative as a V-SMF 22, with respect to providing session management for the communication session. The V-CHF 24 carrying out the method 1000 may also include the V-CHF 24 performing service authorization with respect to the communication session at least in part according to authorization decisions made by the H-CHF 74 in the HCN 50. Additionally, in at least one embodiment where the V-CHF 24 carries out the method 1000, the method 1000 includes the V-CHF 24 generating charging information for the communication session in joint dependence on PCC rules used by the VCN 10 and PCC rules used by the HCN 50.

As noted above, in one or more embodiments, the H-CHF 74 in the HCN 50 provides a return response or responses that include a transaction Id that may be used to confirm that the reported units indicated in the reported usage information have been stored by the H-CHF 74. The transaction Id can be linked or contain the used units and the communication session it relates to, and the transaction Id can then be stored in the V-CHF 24 for later accounting purposes. In cases where a V-SMF 22 in the VCN 10 reports the usage information back to the HCN 10, the method 1000 includes the V-SMF 22 providing the responses/transaction Id to the involved V-CHF 24 in the VCN 10, for storage. In cases where a V-CHF 24 in the VCN 10 reports the usage information back to the HCN 10, the method 1000 includes the V-CHF 24 receiving the responses/transaction Id and performing the storage.

Regarding the above example details, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program, and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item and is not intended to be limiting of such item. The common abbreviation "i.e.", which derives from the Latin phrase "id est", may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and sub-combination of these embodiments. Accordingly, the present specification, including the drawings, shall be construed to constitute a complete written description of various exemplary combinations and sub-combinations of embodiments and of the manner and process of making and using them, and shall support claims to any such combination or sub-combination.

Many variations and modifications can be made to the embodiments without substantially departing from the principles of the present solution. All such variations and modifications are intended to be included herein within the scope of the present disclosure.

What is claimed is:

1. A method of operation by a network node in a Visited Communication Network (VCN), the method comprising:
   determining that usage information for offloaded traffic shall be reported back to a Home Communication Network (HCN), the offloaded traffic being user traffic of a communication session that is offloaded to a Data Network (DN) at the VCN rather than routed back to the HCN, and the communication session involving a communication device that is associated with the HCN;
   obtaining addressing information for reporting the usage information back to the HCN; and
   reporting the usage information for the offloaded traffic back to the HCN in accordance with the addressing information, for charging of the communication session in the HCN,
   wherein determining that the usage information shall be reported back to the HCN comprises the network node determining that the DN has a Data Network Access Identifier (DNAI) indicated in policy information provided to the network node by a policy node in the VCN.

2. The method of claim 1, wherein the network node is operative as a Visited Session Management Function (V-SMF) with respect to the communication session, and wherein reporting the usage information comprises the V-SMF reporting the usage information to a network node in the HCN that is operative as a Home SMF (H-SMF) or operative as a Home Charging Function (H-CHF) in the HCN.

3. The method of claim 2, wherein obtaining the addressing information comprises the V-SMF obtaining an address for communicating with a network node in the HCN that is operative as a Home Charging Function (H-CHF) that performs charging operations in the HCN for the communication session according to the usage information reported for the offloaded traffic, and wherein reporting the usage information comprises the V-SMF reporting the usage information to the H-CHF.

4. The method of claim 1, wherein the network node is operative as a Visited Charging Function (V-CHF) with respect to the communication session, and wherein reporting the usage information comprises the V-CHF reporting the usage information to a network node in the HCN that is operative as a Home CHF (H-CHF) in the HCN.

5. The method of claim 4, wherein the method further comprises the V-CHF obtaining the addressing information from another network node that is operative in the VCN as a Visited Network Repository Function (V-NRF) or operative as a Visited Session Management Function (V-SMF), with respect to providing session management for the communication session.

6. A network node in a Visited Communication Network (VCN), the network node comprising:
   interface circuitry; and
   processing circuitry configured to:
      determine that usage information for offloaded traffic shall be reported back to a Home Communication Network (HCN), the offloaded traffic being user traffic of a communication session that is offloaded to a Data Network (DN) at the VCN rather than routed back to the HCN, and the communication session involving a communication device that is associated with the HCN;

obtain addressing information for reporting the usage information back to the HCN; and report, via the interface circuitry, the usage information for the offloaded traffic back to the HCN in accordance with the addressing information, for charging of the communication session in the HCN, wherein, for determining that the usage information shall be reported back to the HCN, the processing circuitry is configured to determine that the DN has a Data Network Access Identifier (DNAI) indicated in policy information provided to the network node by a policy node in the VCN.

7. The network node of claim 6, wherein the charging is online charging, and wherein the processing circuitry is configured to request a quota that grants a certain amount of service consumption for the communication session, and monitor service consumption for the communication session against the quota.

8. The network node of claim 6, wherein the VCN and HCN are Fifth Generation (5G) Core Networks (CNs).

9. The network node of claim 6, wherein the communication session is a Protocol Data Unit (PDU) session providing a logical connection between the communication device and the DN.

10. The network node of claim 6, wherein the network node is operative as a Visited Session Management Function (V-SMF) with respect to the communication session, and wherein, for reporting the usage information, the processing circuitry is configured to report the usage information to a network node in the HCN that is operative as a Home SMF (H-SMF) or operative as a Home Charging Function (H-CHF) in the HCN.

11. The network node of claim 10, wherein, for obtaining the addressing information, the processing circuitry is configured to obtain the addressing information from one of:
  another network node in the VCN that is operative as a Visited Network Repository Function (V-NRF);
  a network node in the HCN that is operative as a Home NRF (H-NRF);
  the policy node in the VCN that is operative as a Visited Policy Control Function (V-PCF); or
  local configuration information relevant to a Subscription Permanent Identifier (SUFI) associated with the communication device.

12. The network node of claim 10, wherein the processing circuitry is configured to obtain Policy Control and Charging (PCC) rules from a Visited Policy Control Function (V-PCF) in the VCN, for use in supporting the communication session, wherein the PCC rules are agreed between PCC rules applicable to the communication session in the VCN and PCC rules applicable to the communication session in the HCN.

13. The network node of claim 10, wherein, for obtaining the addressing information, the processing circuitry is configured to obtain an address for communicating with a network node in the HCN that is operative as a Home Charging Function (H-CHF) that performs charging operations in the HCN for the communication session according to the usage information reported for the offloaded traffic, and wherein, for reporting the usage information, the processing circuitry is configured to output the usage information towards the H-CHF via the interface circuitry.

14. The network node of claim 13, wherein the processing circuitry is further configured to maintain interfaces towards the H-CHF in the HCN and a Visited CHF (V-CHF) in the VCN, for obtaining service authorizations for the communication session from the V-CHF and the H-CHF, and for reporting the usage information to the V-CHF and the H-CHF.

15. The network node of claim 6, wherein the network node is operative as a Visited Charging Function (V-CHF) with respect to the communication session, and wherein, for reporting the usage information, the processing circuitry is configured to report the usage information to a network node in the HCN that is operative as a Home CHF (H-CHF) in the HCN.

16. The network node of claim 15, wherein, for reporting the usage information, the processing circuitry is configured to maintain an interface with the H-CHF.

17. The network node of claim 15, wherein the processing circuitry is configured to obtain the addressing information from another network node in the VCN that is operative in the VCN as a Visited Network Repository Function (V-NRF) or operative as a Visited Session Management Function (V-SMF), with respect to providing session management for the communication session.

18. The network node of claim 15, wherein the processing circuitry is further configured to perform service authorization with respect to the communication session at least in part according to authorization decisions made by the H-CHF in the HCN.

19. The network node of claim 15, wherein the processing circuitry is further configured to generate charging information for the communication session in joint dependence on Policy Control and Charging (PCC) rules used by the VCN and PCC rules used by the HCN.

20. The network node of claim 6, wherein a Home Charging Function (H-CHF) in the HCN confirms reception of the usage information with a transaction Id and wherein the processing circuitry is configured to store the transaction Id in a Visited CHF (V-CHF) in the VCN, as a confirmation that the usage information has been accepted by the H-CHF.

* * * * *

UNITED STATES PATENT AND TRADEMARK OFFICE
CERTIFICATE OF CORRECTION

| | | |
|---|---|---|
| PATENT NO. | : 12,022,023 B2 | Page 1 of 2 |
| APPLICATION NO. | : 17/912636 | |
| DATED | : June 25, 2024 | |
| INVENTOR(S) | : Keller et al. | |

It is certified that error appears in the above-identified patent and that said Letters Patent is hereby corrected as shown below:

On the Title Page

On Page 2, in Item (56), under "OTHER PUBLICATIONS", in Column 2, Line 12, delete "bages." and insert -- pages. --, therefor.

In the Drawings

In Figure 1, Sheet 1 of 9, Tag "52", Line 1, delete "NODE(s)" and insert -- NODE(S) --, therefor.

In Figure 10, Sheet 8 of 9, and on the Title Page, the illustrative print figure, Line 1, delete "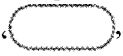" and insert --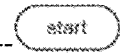--, therefor.

In Figure 10, Sheet 8 of 9, and on the Title Page, the illustrative print figure, Line 20, delete "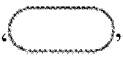" and insert --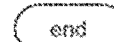--, therefor.

In the Specification

In Column 3, Line 2, delete "Application Management Function (AMF)" and insert -- Access and Mobility Management Function (AMF) --, therefor.

In Column 3, Line 12, delete "NODE(s)"" and insert -- NODE(S)" --, therefor.

In Column 6, Line 54, delete "describes" and insert -- describe --, therefor.

In Column 7, Line 2, delete "id" and insert -- Id --, therefor.

In Column 7, Line 62, delete "applications specific integrated circuitry" and insert -- application specific integrated circuit --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 12,022,023 B2

In Column 9, Line 29, delete "CDROM," and insert -- CD-ROM, --, therefor.

In Column 10, Line 27, delete "touch pad," and insert -- touchpad, --, therefor.

In Column 10, Lines 66-67, delete "Additionally," and insert -- Additionally --, therefor.

In Column 13, Line 48, delete "SUFI" and insert -- SUPI --, therefor.

In Column 14, Line 59, delete "to being," and insert -- to, --, therefor.

In the Claims

In Column 17, Line 43, in Claim 11, delete "(SUFI)" and insert -- (SUPI) --, therefor.